United States Patent
Hayakawa et al.

(10) Patent No.: US 6,936,328 B2
(45) Date of Patent: Aug. 30, 2005

(54) MAGNETIC RECORDING MEDIUM

(75) Inventors: Satoru Hayakawa, Kanagawa (JP); Yuichiro Murayama, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 128 days.

(21) Appl. No.: 10/395,275

(22) Filed: Mar. 25, 2003

(65) Prior Publication Data

US 2003/0180578 A1 Sep. 25, 2003

(30) Foreign Application Priority Data

Mar. 25, 2002 (JP) .................................... P.2002-083291

(51) Int. Cl.⁷ .............................................. G11B 5/733
(52) U.S. Cl. ........................ 428/141; 428/323; 428/402; 428/694 BS; 428/694 BC
(58) Field of Search .......................... 428/694 BS, 141, 428/323, 694 BC, 403

(56) References Cited

U.S. PATENT DOCUMENTS 4,729,846 A * 3/1988 Matsui et al. ............ 252/62.56

* cited by examiner

Primary Examiner—Stevan A. Resan
(74) Attorney, Agent, or Firm—Sughrue Mion, PLLC

(57) ABSTRACT

A magnetic recording medium comprising: a support; a subbing layer comprising a radiation-curable resin; a nonmagnetic layer comprising a nonmagnetic powder and a binder; and at least one magnetic layer comprising a ferromagnetic powder and a binder, in this order, wherein the subbing layer has a thickness of from 0.05 to 1.0 μm, and the nonmagnetic powder has an average acicular ratio of 8 or more and has a form of a raft.

12 Claims, 1 Drawing Sheet

MAGNETIC RECORDING MEDIUM

FIELD OF THE INVENTION

The present invention relates to a magnetic recording medium comprising a support having provided thereon at least a magnetic layer which is excellent in electromagnetic characteristics and durability.

BACKGROUND OF THE INVENTION

In the field of the magnetic disc, a 2 MB MF-2HD flexible disc using Co-modified iron oxide has been generally loaded in a personal computer. However, along with the rapid increase in the amount of data to be dealt with, the capacity of the disc has become insufficient and the increase of the capacity of the flexible disc has been demanded.

In the field of the magnetic tape also, along with the prevalence of the office computer, such as minicomputers, personal computers and work stations, magnetic tapes for recording computer data as external storage media (so-called backup tapes) have been eagerly studied. For putting magnetic tapes for such usage to practical use, the improvement of recording capacity has been strongly demanded for achieving high capacity recording and the miniaturization, in particular, conjointly with the miniaturization of a computer and the increase of information processing performance (i.e., the increase of throughput).

Magnetic recording media comprising a nonmagnetic support having coated thereon a magnetic layer comprising an iron oxide, a Co-modified iron oxide, $CrO_2$, ferromagnetic metal powder (MP), or hexagonal ferrite powder dispersed in a binder have been conventionally widely used. Of these powders, ferromagnetic metal fine powders and hexagonal ferrite fine powders are known to be excellent in high density recording characteristics. In the case of a disc, as high capacity discs using ferromagnetic metal fine powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of these are not satisfactory with respect to capacities and performances. As is the circumstance, various attempts have been made to improve high density recording characteristics. For example, high capacity and high density recording of from 100 M to 120 M, e.g., LS-120 and ZIP, has been realized, and now even higher density recording of areal recording density of 0.2 G bit/inch$^2$ or more has been demanded. In addition, due to the requirement for shortening access time, the speed of rotation of discs has a tendency to increase.

In these high density and high rotation or high transfer magnetic recording media, further higher capacity has been required and supports are required to be thinner.

When a support becomes thinner, pinholes which were not generated before come to occur. In particular, in a polyamide support, the generation of a pinhole having a diameter of 30 $\mu$m or larger is confirmed. A coating solution leaks through a pinhole at the time of coating and transfers to a web, which leads to the generation of dropout (DO).

For compensating for this drawback, measures such as preventing spattering of a coating solution and detecting the soiled position have been taken, however, the drawback could not be compensated for with certainty.

As a means for preventing the generation of pinholes, it has been conventionally performed to coat a radiation-curable resin on a support as a subbing layer, but a subbing layer must be coated thickly to prevent pinholes. As a result, new problems have arisen such that not only high capacity cannot be achieved but also head touch worsens and the S/N ratio lowers.

SUMMARY OF THE INVENTION

An object of the present invention is to provide a magnetic recording medium ensuring uniform head touch and having stable electromagnetic characteristics.

The object of the present invention has been achieved by a magnetic recording medium which comprises a support having provided thereon a subbing layer comprising a radiation-curable resin, a nonmagnetic layer containing nonmagnetic powder and a binder coated on the subbing layer, and at least a magnetic layer containing ferromagnetic powder and a binder coated on the nonmagnetic layer, wherein the subbing layer has a thickness of from 0.05 to 0.1 $\mu$m, the nonmagnetic powder has an average acicular ratio of 8 or more and has the form of a raft.

The preferred embodiments of the present invention are as follows.

1) The magnetic recording medium, wherein the radiation-curable resin is a compound having an alicyclic structure and two or more radiation-curable functional groups in one molecule, and the subbing layer is a layer cured by irradiation with radiation.

2) The magnetic recording medium, wherein from 5 to 1,000 protrusions having a height of from 10 to 20 nm measured by an interatomic force microscope (AEFM) are present per 100 $\mu$m$^2$ of the magnetic layer surface.

BRIEF DESCRIPTION OF THE DRAWING

FIG. 1 is a view showing an example of a conventional nonmagnetic powder (not having the form of a raft).
FIG. 2 is a view showing an example of a nonmagnetic powder having the form of a raft.

DETAILED DESCRIPTION OF THE INVENTION

Figure 2:
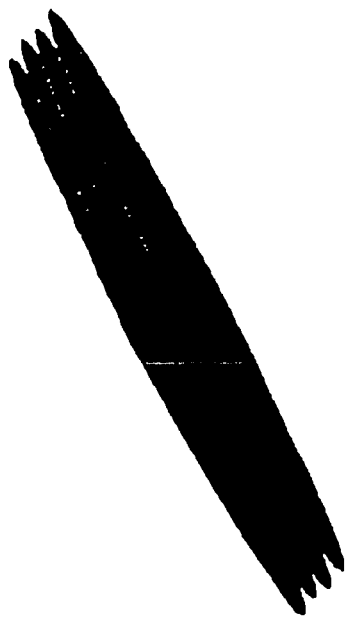
[FIG. 2]
Figure 1:
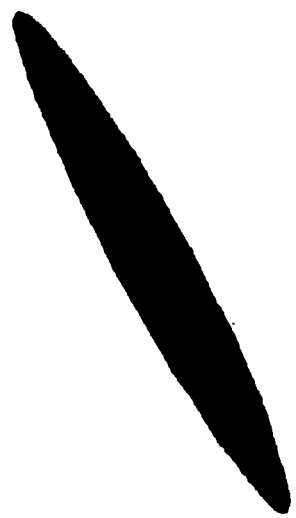
[FIG. 1]

The magnetic recording medium in the present invention comprises a support having provided thereon a subbing layer, a nonmagnetic layer and a magnetic layer in this order from the support. The subbing layer is formed of a radiation-curable resin and has a thickness of from 0.05 to 0.1 $\mu$m, and the nonmagnetic layer contains nonmagnetic powder having an average acicular ratio of 8 or more and shaped like a raft. The nonmagnetic powder is hereinafter also referred to as raft-like nonmagnetic powder.

The raft-like nonmagnetic powder used in the present invention is nonmagnetic powder having an average acicular ratio of 8 or more, the ends in the longitudinal direction of a particle are branched, and the whole shape of the particle is like a raft. The raft-like configuration of the raft-like nonmagnetic powder is retained in a coating solution and in the nonmagnetic layer on the subbing layer as well.

It is thought that interfacial fluctuation is inhibited and the surface smoothness of the magnetic layer is improved particularly when the nonmagnetic layer and the magnetic layer are coated at the same time by simultaneous multilayer coating, since the raft-like nonmagnetic powder is fluidized-oriented in the longitudinal direction even if the subbing layer is as thin as from 0.05 to 0.1 $\mu$m by adding the raft-like nonmagnetic powder to the lower nonmagnetic layer.

A radiation-curable resin used in the present invention is a compound having radiation-curable functional groups, and the radiation-curable resin is contained at least in a coating agent for forming a subbing layer.

The radiation-curable resin used in the invention has a property of becoming a high molecular weight compound and being cured by polymerization or crosslinking when energies by radiation, e.g., electron beams or ultraviolet rays, are applied, and the radiation-curable resin is not subject to reaction so long as energies are not applied. Therefore, a coating solution containing the radiation-curable resin is stable in viscosity so long as the solution is not irradiated with radiation, so that a high film smoothness can be obtained. Further, since a reaction proceeds in a moment by high energy of radiation, a high film strength can be obtained.

This is due to the fact that the viscosity of the radiation-curable resin is relatively low, such as from several mPa·s to 200 mPa·s, and the pinholes and protrusions on a support are shielded by the leveling effect of after coating a subbing layer, thus a smooth support is formed. And it is thought that a magnetic layer excellent in film surface smoothness can be obtained, thus a magnetic recording medium having excellent electromagnetic characteristics can be provided by coating a nonmagnetic solution and a magnetic solution on the subbing layer. This effect is particularly conspicuous in a relatively thin magnetic layer having a thickness of from 0.05 to 2.0 μm, and this technique is effective to decrease minute protrusions on a magnetic layer surface liable to cause noises in magnetic recording using MR heads which have been used with the tendency of high density recording in recent years.

Further, radiation-curable resins having an alicyclic structure are preferably used in the present invention. Since, such radiation-curable resins have high glass transition temperature as compared with conventionally used aliphatic resins, the processes after coating of a subbing layer go on without adhesion trouble. Since such radiation-curable resins have a cyclohexane ring and an alicyclic skeleton such as bicyclo, tricyclo and spiro skeletons, contraction of a film due to curing is less, adhesive with a support can be heightened and excellent running durability can also be obtained.

The radiation-curable resin has a molecular weight of preferably from 200 to 1,000, and more preferably from 200 to 500.

The viscosity of the radiation-curable resin is preferably from 5 to 200 mPa·s at 25° C., and more preferably from 5 to 100 mPa·s.

As the radiation-curable resins, acrylic esters, acrylamides, methacrylic esters, methacrylic acid amides, allyl compounds, vinyl ethers, and vinyl esters can be exemplified. Of these radiation-curable resins, acrylic esters and methacrylic esters are preferred, and acrylic esters having two radiation-curable functional groups, i.e., acryloyl groups, are particularly preferred.

As the radiation-curable resins, compounds having an alicyclic structure and two or more radiation-curable functional groups in one molecule are preferably used in the present invention. The alicyclic structure is a structure having a cyclo skeleton, a bicyclo skeleton, a tricyclo skeleton, a spiro skeleton or a dispiro skeleton. Above all, structures comprising a plurality of rings having atoms in common, e.g., structures having a skeleton such as a bicyclo skeleton, a tricyclo skeleton, a spiro skeleton or a dispiro skeleton are preferred.

As these skeletons, residues of polyol and polyamine for forming radiation-curable resins such as esters and amides are exemplified. Radiation-curable resins comprise radiation-curable functional groups bonded to the residues.

The specific examples of radiation-curable resins include cyclopropane diacrylate, cyclopentane diacrylate, cyclohexane diacrylate, cyclobutane diacrylate, dimethylolcyclopropane diacrylate, dimethylolcyclopentane diacrylate, dimethylolcyclohexane diacrylate, dimethylolcyclobutane diacrylate, cyclopropane dimethacrylate, cyclopentane dimethacrylate, cyclohexane dimethacrylate, cyclobutane dimethacrylate, dimethylolcyclopropane dimethacrylate, dimethylolcyclopentane dimethacrylate, dimethylolcyclohexane dimethacrylate, dimethylolcyclobutane dimethacrylate, bicyclobutane diacrylate, bicyclooctane diacrylate, bicyclononane diacrylate, bicycloundecane diacrylate, dimethylolbicyclobutane diacrylate, dimethylolbicyclooctane diacrylate, dimethylolbicyclononane diacrylate, dimethylolbicycloundecane diacrylate, bicyclobutane dimethacrylate, bicyclooctane dimethacrylate, bicyclononane dimethacrylate, bicycloundecane dimethacrylate, dimethylolbicyclobutane dimethacrylate, dimethylolbicyclooctane dimethacrylate, dimethylolbicyclononane dimethacrylate, dimethylolbicycloundecane dimethacrylate, tricycloheptane diacrylate, tricyclodecane diacrylate, tricyclododecane diacrylate, tricycloundecane diacrylate, tricyclotetradecane diacrylate, tricyclodecanetridecane diacrylate, dimethyloltricycloheptane diacrylate, dimethyloltricyclodecane diacrylate, dimethyloltricyclododecane diacrylate, dimethyloltricycloundecane diacrylate, dimethyloltricyclotetradecane diacrylate, dimethyloltricyclodecanetridecane diacrylate, tricycloheptane dimethacrylate, tricyclodecane dimethacrylate, tricyclododecane dimethacrylate, tricycloundecane dimethacrylate, tricyclotetradecane dimethacrylate, tricyclodecanetridecane dimethacrylate, dimethyloltricycloheptane dimethacrylate, dimethyloltricyclodecane dimethacrylate, dimethyloltricyclododecane dimethacrylate, dimethyloltricycloundecane dimethacrylate, dimethyloltricyclotetradecane dimethacrylate, dimethyloltricyclodecanetridecane dimethacrylate, spirooctane diacrylate, spiroheptane diacrylate, spirodecane diacrylate, cyclopentanespirocyclobutane diacrylate, cyclohexanespirocyclopentane diacrylate, spirobicyclohexane diacrylate, dispiroheptadecane diacrylate, dimethylolspirooctane diacrylate, dimethylolspiroheptane diacrylate, dimethylolspirodecane diacrylate, dimethylolcyclopentanespirocyclobutane diacrylate, dimethylolcyclohexanespirocyclopentane diacrylate, dimethylolspirobicyclohexane diacrylate, dimethyloldispiroheptadecane diacrylate, spirooctane dimethacrylate, spiroheptane dimethacrylate, spirodecane dimethacrylate, cyclopentanespirocyclobutane dimethacrylate, cyclohexanespirocyclopentane dimethacrylate, spirobicyclohexane dimethacrylate, dispiroheptadecane dimethacrylate, dimethylolspirooctane dimethacrylate, dimethylolspiroheptane dimethacrylate, dimethylolspirodecane dimethacrylate, dimethylolcyclopentanespirocyclobutane dimethacrylate, dimethylolcyclohexanespirocyclopentane dimethacrylate, dimethylolspirobicyclohexane dimethacrylate, and dimethyloldispiroheptadecane dimethacrylate.

Of the above examples, dimethyloltricyclodecane diacrylate, dimethylolbicyclooctane diacrylate and dimethylolspirooctane diacrylate are preferred.

Dimethyloltricyclodecane diacrylate is particularly preferred. As the commercially available specific compounds, KAYARAD R-684 (manufactured by Nippon Kayaku Co., Ltd.), light acrylate DCP-A (manufactured by Kyoeisha Kagaku Co., Ltd.), and LUMICURE DCA-200 (manufactured by Dainippon Chemicals & Ink Co., Ltd.) are exemplified.

As a subbing agent, other radiation-curable compounds can be used in combination with the compounds having the above alicyclic structure and two or more radiation-curable functional groups in one molecule. As the compounds which can be used in combination, monofunctional compounds and methacrylate compounds are exemplified, and these compounds can be used as a reactive diluent. A reactive diluent has a function of adjusting the physical properties and curing reaction of a subbing agent.

As the preferred structure of a compound which can be used in combination, monofunctional acrylate compounds having one radiation-curable functional group in one molecule are exemplified, and specifically, cyclohexyl (meth) acrylate, isobonyl (meth)acrylate and tetrahydrofurfuryl (meth)acrylate are exemplified. (Meth)acrylate means to include acrylate and methacrylate.

The proportion of the amount of a compound usable in combination is preferably from 10 to 100 mass % based on the compounds having an alicyclic structure and two or more radiation-curable functional groups in one molecule.

A subbing agent containing a radiation-curable resin can be dissolved in a solvent, if necessary. The viscosity of a subbing agent is preferably from 5 to 200 mPa·s. Methyl ethyl ketone (MEK), methanol, ethanol and toluene are preferably used as the solvent.

A subbing agent is coated on a support, dried, and then irradiated with radiation to be cured. The glass transition temperature (Tg) after curing of a subbing layer is preferably from 80 to 150° C., and more preferably from 100 to 130° C. When Tg is less than 80° C., there are cases where adhesion troubles are brought about in a coating process, and when Tg exceeds 150° C., the film sometimes becomes brittle.

The thickness of a subbing layer is preferably from 0.05 to 1.0 $\mu$m, and more preferably from 0.05 to 0.07 $\mu$m. When the thickness is less than 0.05 $\mu$m, sufficient smoothness can be obtained with difficulty. When the thickness is more than 1.0 $\mu$m, the coated film is difficult to be dried, which sometimes causes adhesion troubles.

As the support on which a subbing layer is provided, well-known supports can be used, e.g., biaxially stretched polyethylene terephthalate, polyethylene naphthalate, polyamide (aromatic and aliphatic), and polyamideimide (aromatic and aliphatic). Polyethylene terephthalate, polyethylene naphthalate and polyamide are preferably used.

These supports may be subjected to surface treatments, e.g., corona discharge treatment, plasma treatment, adhesion assisting treatment or heat treatment.

It is preferred to use supports having a central plane average surface roughness of from 3 to 10 nm at cut-off value of 0.25 mm.

A subbing agent coated on a support and dried is irradiated with radiation.

As the radiation, electron beams and ultraviolet rays can be used in the present invention. When ultraviolet rays are used, it is necessary to add a photopolymerization initiator to a subbing agent. When electron beams are used, a photopolymerization initiator is not necessary to be added, and electron beam is deep in permeation depth, and so preferably used.

As electron beam accelerators, a scanning method, a double scanning method and a curtain beam method can be used. A curtain beam method is preferred, since high output can be obtained relatively inexpensively. As electron beam characteristics, accelerating voltage is generally from 30 to 1,000 kV, and preferably from 50 to 300 kV, absorbed dose is generally from 0.5 to 20 Mrad, and preferably from 2 to 10 Mrad. When accelerating voltage is less than 30 kV, permeation amount of energy is insufficient, and when it exceeds 300 kV, the efficiency of energy used in polymerization is reduced, thus uneconomic.

The atmosphere of electron beam irradiation is preferably oxygen concentration of 200 ppm or less by purging nitrogen. When oxygen concentration is high, crosslinking and curing reaction in the vicinity of the surface is hindered.

A mercury lamp is used as an ultraviolet light source. A mercury lamp having a capacity of from 20 to 240 W/cm is used at a velocity of from 0.3 to 20 m/min. The distance between a mercury lamp and a substrate is generally preferably from 1 to 30 cm.

A photo-radical polymerization initiator is used as the photopolymerization initiator for use in ultraviolet curing. In detail, photo-radical polymerization initiators described in *Shin Kobunshi Jikken-Gaku, Hikari•Hoshasen Jugo (New High Polymer Experiments, Photo•Radiation Polymerization)*, Chap. 6, Vol. 2, compiled by Kobunshi Gakkai, published by Kyoritsu Shuppan Co., Ltd. (1995) can be used. Specifically, acetophenone, benzophenone, anthraquinone, benzoin ethyl ether, benzyl methyl ketal, benzyl ethyl ketal, benzoin isobutyl ketone, hydroxydimethyl phenyl ketone, 1-hydroxycyclohexyl phenyl ketone, and 2,2-diethoxyacetophenone can be used.

The mixing ratio of a photopolymerization initiator is generally from 0.5 to 20 mass parts per 100 mass parts of the radiation-curable compound, preferably from 2 to 15 mass parts, and more preferably from 3 to 10 mass parts.

With respect to radiation-curing apparatus and irradiating conditions, well-known apparatus and irradiating conditions can be used, e.g., those described in *UV•EB Koka Gijutsu (Curing Techniques of UV and EB)*, published by Sogo Gijutsu Center Co., and *Tei Energy Denshi-sen Shosha no Oyo Gijutsu (Applied Technology of Low Energy Electron Beam Irradiation)*, published by CMC Co. (2000).

By providing the above-described subbing layer on a support, the number of protrusions having a height of from 10 to 20 nm measured by an interatomic force microscope (AFM) on the magnetic layer of the magnetic recording medium according to the present invention can be controlled to 5 to 1,000 per 100 $\mu m^2$ of the magnetic layer surface.

The height measured by an interatomic force microscope (AFM) is defined as the height with the central plane obtained by an interatomic force microscope (such a plane as the volume enclosed with the plane and the roughness curve of the magnetic layer surface is equal and smallest on the upper and lower sides of the plane) as the reference plane.

Accordingly, the protrusion number (hereinafter also referred to as "PN") having a height of from 10 to 20 nm per 100 $\mu m^2$ of the magnetic layer surface is the total number of protrusions per 10 $\mu m$ square having the height higher than the reference plane of from 10 to 20 nm, which is protrusion density. PN is more preferably from 5 to 100 per 100 $\mu m^2$. When PN is less than 5, the friction coefficient disadvantageously increases, and when PN is more than 100, the output is reduced and the number of dropout (DO) is liable to increase.

The magnetic recording medium in the present invention is manufactured by forming a subbing layer, and then forming a nonmagnetic layer and a magnetic layer on the subbing layer. The subbing layer is provided at least on one side of a support, or the subbing layer may be provided on both sides. The nonmagnetic layer is formed by coating a composition containing raft-like nonmagnetic powder dispersed in a binder, and the magnetic layer is formed by coating a composition containing magnetic powder dispersed in a binder.

As the binder, polyurethane resins, polyester resins, polyamide resins, vinyl chloride resins, acrylate resins of copolymers of styrene, acrylonitrile and methyl methacrylate, cellulose resins, e.g., nitrocellulose, epoxy resins, phenoxy resins, and polyvinyl alkyral resins, e.g., polyvinyl acetal and polyvinyl butyral can be used alone or a plurality of these resins can be used as mixture. Of these resins, polyurethane resins, vinyl chloride resins and acrylate resins are preferred. For improving the dispersibility of magnetic powder and nonmagnetic powder, it is preferred that binders have a functional group (a polar group) adsorptive onto these powders. The examples of preferred functional groups include $—SO_3M$, $—SO_4M$, $—PO(OM)_2$, $—OPO(OM)_2$, $—COOM$, $—R^1R^2NSO_3M$, $—R^1R^2NRSO_3M$, $—NR^1R^2$, and $—N^+R^1R^2R^3X$, wherein M represents hydrogen, or an alkali metal, e.g., Na or K; R represents an alkylene group; $R^1$, $R^2$ and $R^3$ each represents an alkyl group, a hydroxyalkyl group or hydrogen, and $R^1$ and $R^2$ may form a ring together; and X represents halogen, e.g., Cl or Br. The amount of a functional group in the binder is preferably from 10 to 200 µeq/g, and more preferably from 30 to 120 µeq/g. When the amount of a functional group is out of this range, at least the dispersibility lowers.

It is preferred that the binder have a functional group having active hydrogen, e.g., an —OH group, to react with an isocyanate curing agent and form a crosslinking structure, to thereby improve film strength, in addition to the adsorptive functional group. The amount of the functional group having active hydrogen is preferably from 0.1 to 2 meq/g. The binders have a mass average molecular weight of preferably from 10,000 to 200,000, and more preferably from 20,000 to 100,000. When the molecular weight is smaller than this value, the film strength is insufficient and durability lowers. When the average molecular weight is greater than this range, the dispersibility lowers.

Polyurethane resins which are the preferred binders are described in detail, e.g., in compiled by Keiji Iwata, *Polyurethane Jushi Handbook* (*Polyurethane Resin Handbook*), Nikkan Kogyo Shinbun-Sha, (1986). The polyurethane resins can be generally obtained by addition polymerization of long chain diol, short chain diol (sometimes referred to as "a chain extender") and a diisocyanate compound. As the long chain diols, polyester diol having a molecular weight of from 500 to 5,000, polyether diol, polyether ester diol, polycarbonate diol and polyolefin diol are used. The polyurethane resins are called polyester urethane, polyether urethane, polyether ester urethane or polycarbonate urethane by the kind of long chain polyols.

The polyester diols are obtained by condensation polymerization of aliphatic dibasic acid, e.g., adipic acid, sebacic acid, or azelaic acid; or aromatic dibasic acid, e.g., isophthalic acid, orthophthalic acid, terephthalic acid, or naphthalenedicarboxylic acid, with glycol. As the glycol components, ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol, 1,8-octanediol, 1,9-nonanediol, cyclohexanediol, cyclohexanedimethanol, and hydrogenated bisphenol A are exemplified. Besides these compounds, polycaprolactone diol and polyvalerolactone diol obtained by ring opening polymerization of lactone such as ε-caprolactone and γ-valerolactone can also be used as the polyester diols. As the polyester diols, those having branched side chains, those obtained from aromatic or alicyclic starting materials are preferred from the viewpoint of the resistance to hydrolysis.

As the polyether diols, those obtained by addition polymerization of alkylene oxide, e.g., ethylene oxide or propylene oxide, to aromatic glycols and alicyclic diols, e.g. polyethylene glycol, polypropylene glycol, polytetramethylene glycol, bisphenol A, bisphenol S, bisphenol P, or hydrogenated bisphenol A are exemplified.

A plurality of kinds of these long chain diols can be used as combination or mixture. Short chain diols can be selected from the compounds of the same group as exemplified above in the glycol components of polyester diols. When a small amount of trifunctional or higher polyhydric alcohol, e.g., trimethylolethane, trimethylolpropane or pentaerythritol, is used in combination, polyurethane resin having a branched structure is obtained, by which the viscosity of the solution can be lowered, or curing property with an isocyanate curing agent can be heightened by increasing OH groups at the terminals of polyurethane.

As the diisocyanate compounds, aromatic diisocyanate, e.g., MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), and aliphatic and alicyclic diisocyanate, e.g., transcyclohexane-1,4-diisocyanate, HDI (hexamethylene diisocyanate), IPDI (isophorone diisocyanate), $H_6XDI$ (hydrogenated xylylene diisocyanate), and $H_{12}MDI$ (hydrogenated diphenylmethane diisocyanate) are used.

The preferred composition of long chain diol/short chain diol/diisocyanate in the polyurethane resin is (80 to 15 mass %)/(5 to 40 mass %)/(15 to 50 mass %). The concentration of the urethane group in the polyurethane resin is preferably from 1 to 5 meq/g, and more preferably from 1.5 to 4.5 meq/g. When the concentration of the urethane group is less than this range, the mechanical strength is insufficient, and when the concentration is more than this range, the solution viscosity increase and dispersibility lowers. The glass transition temperature of the polyurethane resin is preferably from 0 to 200° C., and more preferably from 40 to 160° C. When the glass transition temperature is lower than this range, the durability lowers, and when it is higher than this range, the calendering property lowers and the electromagnetic characteristics are deteriorated. As the methods of incorporating the above-described adsorptive functional group (a polar group) to the polyurethane resin, a method of using a functional group in a part of the monomer of long chain diol, a method of using a functional group in a part of short chain diol, and a method of incorporating a polar group by a polymer reaction after polyurethane has been polymerized are known.

As the vinyl chloride resins, those obtained by copolymerization of vinyl chloride monomer with various monomers are used. As the comonomers, vinyl esters of fatty acids, e.g., vinyl acetate and vinyl propionate, acrylates and methacrylates, e.g., methyl (meth)acrylate, ethyl (meth) acrylate, isopropyl (meth)acrylate, butyl (meth)acrylate, and benzyl (meth)acrylate, alkylallyl ethers, e.g., allylmethyl ether, allylethyl ether, allylpropyl ether, and allylbutyl ether, other styrene, α-methylstyrene, vinylidene chloride, acrylonitrile, ethylene, butadiene, acrylamide, and as comonomers having a functional group, vinyl alcohol, 2-hydroxyethyl (meth)acrylate, polyethylene glycol (meth) acrylate, 2-hydroxypropyl (meth)acrylate, 3-hydroxypropyl (meth)acrylate, polypropylene glycol (meth)acrylate, 2-hydroxyethylallyl ether, 2-hydroxypropylallyl ether, 3-hydroxypropylallyl ether, p-vinylphenol, maleic acid, maleic anhydride, acrylic acid, methacrylic acid, glycidyl (meth)acrylate, allylglycidyl ether, phosphoethyl (meth) acrylate, sulfoethyl (meth)acrylate, p-styrenesulfonic acid, and Na salts and K salts of these compounds are used. (Meth)acrylate means that at least either one of acrylate or methacrylate is contained.

The composition of the vinyl chloride monomer in the vinyl chloride resins is preferably from 60 to 95 mass %. When the vinyl chloride monomer is less than this range, the mechanical strength lowers, and when the vinyl chloride monomer is more than this range, the solvent solubility lowers and the solution viscosity becomes high, as a result, the dispersibility is reduced. The preferred amount of the functional groups for increasing curing property with an adsorptive functional group (a polar group) and a polyisocyanate curing agent is as described above. The functional groups may be introduced by copolymerization with the above-described functional group-containing monomer, or the functional groups may be introduced by a polymer reaction after the vinyl chloride resin has been copolymerized. The polymerization degree is preferably from 200 to 600, and more preferably from 240 to 450. When the degree is less than this range, the mechanical strength lowers, and when the degree is more than this range, the solution viscosity becomes high, as a result, the dispersibility is reduced.

A curing agent can be used for crosslinking and curing the binder in the present invention to thereby increase the mechanical strength and heat resistance of the film. A preferred curing agent is a polyisocyanate compound. Trifunctional or higher polyisocyanates are preferred as the polyisocyanate compound. The specific examples of the trifunctional or higher polyisocyanates include adduct type polyisocyanate compounds, e.g., a compound obtained by adding 3 mols of TDI (tolylene diisocyanate) to trimethylolpropane (TMP), a compound obtained by adding 3 mols of HDI (hexamethylene diisocyanate) to TMP, a compound obtained by adding 3 mols of IPDI (isophorone diisocyanate) to TMP, and a compound obtained by adding 3 mols of XDI (xylylene diisocyanate) to TMP, a condensed isocyanurate type trimer of TDI, a condensed isocyanurate type pentamer of TDI, a condensed isocyanurate type heptamer of TDI, mixtures of these compounds, an isocyanurate type condensate of HDI, an isocyanurate type condensate of IPDI, and crude MDI. Of these compounds, a compound obtained by adding 3 mols of TDI to TMP and a condensed isocyanurate type trimer of TDI are preferred.

Radiation-curable type curing agents, e.g., electron beams or ultraviolet rays, may be used besides the isocyanate curing agent. In such a case, curing agents having two or more, preferably three or more, acryloyl groups or methacryloyl groups in the molecule as the radiation-curable functional groups can be used. As such curing agents, e.g., TMP (trimethylolpropane) triacrylate, pentaerythritol tetraacrylate, and urethane acrylate oligomer are exemplified. In this case, it is preferred to introduce a (meth)acryloyl group not only to the curing agent but to the binder. In the case of ultraviolet curing, a photosensitizer is used in combination, other than the above. The curing agent is preferably added in proportion of from 0 to 80 mass parts per 100 mass parts of the binder. Too much amount results in the deterioration of dispersibility.

The ferromagnetic powders which can be used in the magnetic recording medium according to the present invention are ferromagnetic iron oxide, cobalt-containing ferromagnetic iron oxide, and ferromagnetic alloy powder, and they have a specific surface area ($S_{BET}$) as measured by the BET method of generally from 40 to 80 m$^2$/g, and preferably from 50 to 70 m$^2$/g, a crystallite size of generally from 12 to 25 nm, preferably from 13 to 22 nm, and particularly preferably from 14 to 20 nm, and a long axis length of generally from 0.05 to 0.25 µm, preferably from 0.07 to 0.2 µm, and particularly preferably from 0.08 to 0.15 µm. The examples of ferromagnetic metal powders include Fe, Ni, Fe—Co, Fe—Ni, Co—Ni and Co—Ni—Fe, and the alloy powders containing the following elements in the range of 20 mass % or less based on the amount of the metal component, e.g., aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth. The ferromagnetic metal powders may contain a small amount of water, a hydroxide or an oxide. The producing methods of these ferromagnetic powders are well-known, and the ferromagnetic powders for use in the present invention can be produced according to well-known methods. The figure of the ferromagnetic powders is not particularly limited, and any figure such as an acicular, granular, die-like, ellipsoidal and tabular figures can be used in the present invention. Acicular ferromagnetic powders are particularly preferably used.

A magnetic coating solution is prepared by kneading and dispersing the above resin component, curing agent and ferromagnetic powder with a solvent, e.g., methyl ethyl ketone, dioxane, cyclohexanone or ethyl acetate which is generally used for preparing a magnetic coating solution. Kneading and dispersing can be performed by ordinary methods.

The magnetic layer may take multilayer constitution. For example, a lower magnetic layer and an upper magnetic layer may be provided in this order on the nonmagnetic layer. As the magnetic powders which can be used in the lower magnetic layer, alloys containing gamma-Fe$_2$O$_3$, Co-modified gamma-Fe$_2$O$_3$ or alpha-Fe as the main component, and CrO$_2$ are exemplified, and Co-modified gamma-Fe$_2$O$_3$ is particularly preferred. It is preferred that the ferromagnetic powder for use in the lower layer and the ferromagnetic powder for use in the upper magnetic layer have different compositions and properties. For example, for improving long wave recording characteristics, it is preferred that Hc in the lower magnetic layer is lower than that in the upper magnetic layer, and it is effective that Br in the lower magnetic layer is higher than that in the upper magnetic layer. In addition, advantages of well-known multilayer constitution can be utilized.

The magnetic recording medium in the present invention has a nonmagnetic layer containing raft-like nonmagnetic powder on a subbing layer.

The nonmagnetic powder having an average acicular ratio of 8 or more which can constitute the raft-like nonmagnetic powder can be selected from inorganic compounds, e.g., metallic oxide, metallic carbonate, metallic sulfate, metallic nitride, metallic carbide, and metallic sulfide. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred.

The raft-like nonmagnetic powders have an average long axis length of preferably from 0.07 to 0.12 $\mu$m, and more preferably from 0.08 to 0.11 $\mu$m. The average acicular ratio of the raft-like nonmagnetic powders means the arithmetic mean of (long axis length/short axis length), and the short axis length means the longest length of the axes orthogonal to a long axis (excluding the branched parts). The long axis length means the length of the axis (the long axis) between the basal parts of branched parts of the ends in the longitudinal direction. (The long axis length means the longest length of the axes in the longitudinal direction.)

The raft-like nonmagnetic powders have a pH value of preferably from 6 to 9; a specific surface area of preferably from 80 to 120 m$^2$/g, and more preferably from 90 to 110 m$^2$/g; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, and preferably from 3 to 6.

The surfaces of these raft-like nonmagnetic powders are preferably covered with $Al_2O_3$, $SiO_2$, $TiO_2$, $ZrO_2$, $SnO_2$, $Sb_2O_3$ or ZnO. $Al_2O_3$, $SiO_2$, $TiO_2$ and $ZrO_2$ are particularly preferred in the point of dispersibility, and $Al_2O_3$, $SiO_2$ and $ZrO_2$ are more preferred. These surface-covering agents can be used in combination or may be used alone. Surface treatment may be performed by coprecipitation, alternatively, surface treatment of particles may be previously performed to be covered with alumina in the first place, and then the alumina-covered surface may be covered with silica, or vice versa, according to purposes. If necessary, a surface-covered layer may be porous, but a homogeneous and dense surface is generally preferred.

The raft-like nonmagnetic powders can be manufactured by adjusting the annealing treatment after dehydration of the nonmagnetic powder formed more weakly than ordinary annealing treatment in the manufacture of general acicular nonmagnetic powder using iron salts.

Nonmagnetic powders having other figures may be used in the nonmagnetic layer in combination with the raft-like nonmagnetic powder of the present invention in the range of not increasing or decreasing the effect of the present invention.

As other additives for use in the magnetic layer and the nonmagnetic layer of the present invention, those having a lubricating effect, an antistatic effect, a dispersing effect and a plasticizing effect may be used. The examples of additives which can be used in the invention include molybdenum disulfide, tungsten disulfide, carbon black, graphite, boron nitride, graphite fluoride, silicone oil, polar group-containing silicone, fatty acid-modified silicone, fluorine-containing silicone, fluorine-containing alcohol, fluorine-containing ester, polyolefin, polyglycol, alkyl phosphate and alkali metallic salt thereof, alkyl sulfate and alkali metallic salt thereof, polyphenyl ether, fluorine-containing alkyl sulfate and alkali metallic salt thereof, monobasic fatty acids having from 10 to 24 carbon atoms (which may contain an unsaturated bond or may be branched) and metallic salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 2 to 22 carbon atoms, and aliphatic amines having from 8 to 22 carbon atoms. The specific examples of these additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitanmonostearate, anhydrosorbitandistearate, anhydrosorbitantristearate, oleyl alcohol and lauryl alcohol.

Nonionic surfactants, e.g., alkylene oxide, glycerol, glycidol and alkylphenol-ethylene oxide adducts; cationic surfactants, e.g., cyclic amines, ester amides, quaternary ammonium salts, hydantoin derivatives, heterocyclic rings, phosphoniums and sulfoniums; anionic surfactants containing an acidic group such as carboxylic acid, sulfonic acid, phosphoric acid, a sulfate group or a phosphate group; and ampholyticsurfactants, e.g., amino acids, aminosulfonic acids, sulfates or phosphates of amino alcohols, and alkylbetains can also be used in the present invention. The details of these surfactants are described in *Kaimen Kasseizai Binran* (*Handbook of Surfactants*), Sangyo Tosho Co., Ltd. These lubricants and antistatic agents need not be 100% pure and may contain impurities such as isomers, non-reacted products, byproducts, decomposed products and oxides, in addition to the main components. However, the content of such impurities is preferably 30 mass % or less, and more preferably 10 mass % or less.

The kinds and amounts of the lubricants and surfactants which are used in the present invention can be used properly in the nonmagnetic layer and the magnetic layer according to necessity. For example, the nonmagnetic layer and the magnetic layer can separately contain different fatty acids each having a different melting point so as to prevent bleeding out of the fatty acids to the surface, or different esters each having a different boiling point or a different polarity so as to prevent bleeding out of the esters to the surface. Also, the amounts of surfactants are controlled so as to improve the coating stability, or the nonmagnetic layer contains a larger amount of lubricant so as to improve the lubricating effect of the surface thereof. Examples are by no means limited thereto. All or apart of the additives tobe used in the present invention may be added to the magnetic coating solution or the nonmagnetic coating solution in any step of the preparation. For example, additives may be blended with a ferromagnetic powder before kneading step, may be added during the step of kneading a ferromagnetic powder, a binder and a solvent, may be added during the dispersing step, may be added after the dispersing step, or may be added immediately before coating.

The specific examples of the lubricants which are used in the present invention include NAA-102, castor oil-hardened fatty acid, NAA-42, Cation SA, Nymeen L-201, Nonion E-208, Anon BF, Anon LG, butyl stearate, butyl laurate and erucic acid (manufactured by Nippon Oils and Fats Co.); oleic acid (manufactured by Kanto Chemical Co.); FAL-205 and FAL-123 (manufactured by Takemoto Oils and Fats Co.); Enujerubu OL (manufactured by Shin Nihon Rika Co., Ltd.); TA-3 (manufactured by Shin-Etsu Chemical Co.); Armide P (manufactured by Lion Ahmer Co. Ltd.); Duomin TDO (manufactured by Lion Fat and Oil Co. Ltd.) ; BA-41G (manufactured by Nisshin Oil Mills Co., Ltd.); Profan 2012E, Newpole PE61 and Ionet MS-400 (manufactured by Sanyo Chemical Co. Ltd.).

A coating solution prepared with the above materials is coated on a support to form a nonmagnetic layer or a magnetic layer. The magnetic recording medium in the present invention is produced, e.g., by multilayer coating of a nonmagnetic layer coating solution and a magnetic layer coating solution successively or simultaneously on the surface of a subbing layer of a support during running. Air doctor coating, blade coating, rod coating, extrusion coating, air knife coating, squeeze coating, immersion coating, reverse roll coating, transfer roll coating, gravure coating, kiss coating, cast coating, spray coating and spin coating can be used for the above magnetic layer coating or the nonmagnetic layer coating. These methods are described, e.g., in *Saishin Coating Gijutsu* (*The Latest Coating Techniques*), Sogo Gijutsu Center Co. (May 31, 1983).

The following methods and apparatus are suggested when the present invention is applied to a magnetic recording medium comprising the constitution of two or more layers.
(1) A lower layer is coated by any of gravure coating, roll coating, blade coating, and extrusion coating apparatus, which are ordinarily used in the coating of a magnetic coating solution, and an upper layer is coated while the lower layer is still wet by means of the support pressing type extrusion coating apparatus disclosed in JP-B-1-46186 (the term "JP-B" as used herein means an "examined Japanese patent publication"), JP-A-60-238179 (the term "JP-A" as used herein means an "unexamined published Japanese patent application"), and JP-A-2-265672.
(2) A lower layer and an upper layer are coated almost simultaneously by using a coating head equipped with two slits for feeding coating solution as disclosed in JP-A-63-88080, JP-A-2-17971 and JP-A-2-265672.
(3) A lower layer and an upper layer are coated almost simultaneously by using the extrusion coating apparatus equipped with a backup roll as disclosed in JP-A-2-174965.

A backing layer may be provided on the side of a support on which a magnetic coating solution is not coated. The backing layer is a layer provided on the side of a support on which a magnetic coating solution is not coated by coating a backing layer-forming coating solution comprising granular components such as an abrasive and an antistatic agent and a binder dispersed in an organic solvent. As the granular components, various inorganic pigments and carbon blacks can be used. As the binder, resins, e.g., nitrocellulose, a phenoxy resin, a vinyl chloride resin, and polyurethane, can be used alone or as mixture. A subbing layer according to the present invention or well-known subbing layer may be provided on the coating surface of a backing layer-forming coating solution on a support.

The coated layer of a magnetic layer coating solution is dried after the ferromagnetic powder contained in the coated layer of the magnetic layer coating solution has been subjected to orientation treatment of the magnetic field. After being dried, the coated layers are subjected to surface smoothing treatment. Super calender rolls are used for surface smoothing treatment. Since the holes generated by the removal of the solvent by drying vanish by the surface smoothing treatment and the packing rate of the ferromagnetic powder in the magnetic layer is improved, the magnetic recording medium having high electromagnetic characteristics can be obtained. As the rolls for calendering treatment, heat resisting plastic rolls, e.g., epoxy, polyimide, polyamide and polyamideimide are used. Metal rolls may be used for the treatment.

As the magnetic recording medium for high density recording, it is preferred that the surface of the magnetic recording medium according to the present invention have excellent smoothness such as the central line average roughness of the surface of from 0.1 to 5 nm at cutoff value of 0.25 mm, and preferably from 1 to 4 nm. Such marked smoothness can be achieved by the calendering treatment on the surface of the magnetic layer formed by selecting from the specific ferromagnetic powder and the binder as described above. The calendering treatment is preferably performed at the temperature of the calender roll of from 60 to 100° C., preferably from 70 to 100° C., and particularly preferably from 80 to 100° C., and the pressure of generally from 100 to 500 kg/cm (from 98 to 490 kN/m), preferably from 200 to 450 kg/cm (from 196 to 441 kN/m), and particularly preferably from 300 to 400 kg/cm (from 294 to 392 kN/cm). The obtained magnetic recording medium is cut to a desired size with a cutter and the like and used.

EXAMPLES

The present invention will be described in detail below with reference to specific examples, but it should not be construed as being limited thereto. In the examples, "part" means "mass part (part by weight)", unless otherwise indicated.

Example 1

Ferromagnetic alloy powder (100 parts) (composition: Fe 89 atomic %, Co 5 atomic %, Y 6 atomic %, Hc: 2,000 Oe (160 kA/m), crystallite size: 15 nm, $S_{BET}$: 59 m$^2$/g, average long axis length: 0.12 μm, average acicular ratio: 7, saturation magnetization as: 150 A·m$^2$/kg) was pulverized in an open kneader for 10 minutes, then 10 parts (solid content) of an SO$_3$Na-containing polyurethane solution (solid content: 30%, SO$_3$Na content: 70 μeq/g, mass average molecular weight: 40,000), and 30 parts of cyclohexanone were added to the above ferromagnetic alloy powder, and the mixture was kneaded for 60 minutes, and then

| | |
|---|---|
| Abrasive (Al$_2$O$_3$) (particle size: 0.3 μm) | 2 parts |
| Carbon black (particle size: 40 nm) | 2 parts |
| Methyl ethyl ketone/toluene = 1/1 | 200 parts | were added and dispersed in a sandmill for 120 minutes. Thereto were added

| | |
|---|---|
| Polyisocyanate (Coronate 3041, manufactured by Nippon Polyurethane Co., Ltd.) | 5 parts (solid content) |
| Butyl stearate | 2 parts |
| Stearic acid | 1 part |
| Methyl ethyl ketone | 50 parts | followed by stirring and mixing for further 20 minutes, and the mixture was filtered through a filter having an average pore diameter of 1 μm, thereby a magnetic coating solution was obtained.

Preparation of Coating Solution for Nonmagnetic Layer:

Raft-like nonmagnetic powder: alpha-Fe$_2$O$_3$ (average acicular ratio: 8.5, average long axis length: 0.15 μm, $S_{BET}$:

130 m²/g, surface treatment with $Al_2O_3$ and $SiO_2$, pH: 6.5 to 8.0) (100 parts) was pulverized in an open kneader for 10 minutes, then 7.5 parts of the compound obtained by adding sodium hydroxyethylsulfonate to the copolymer of vinyl chloride/vinyl acetate/glycidyl methacrylate=86/9/5 ($SO_3Na$: $6×10^{-5}$ eq/g, epoxy: $10^{-3}$ eq/g, Mw: 30,000), and 10 parts (solid content) of a $SO_3Na$-containing polyurethane solution (solid content: 30%, $SO_3Na$ content: 70 µeq/g, mass average molecular weight: 40,000), and 40 parts of carbon black (particle size: 40 nm) were added to above pulverized powder, and 30 parts of cyclohexanone were further added, and the mixture was kneaded for 60 minutes, and then

| | |
|---|---|
| Methyl ethyl ketone/toluene (1/1) | 200 parts | was added thereto, and the reaction mixture was dispersed in a sand mill for 120 minutes. Thereto were added

| | |
|---|---|
| Polyisocyanate (Coronate 3041, manufactured by Nippon Polyurethane Co., Ltd.) | 5 parts (solid content) |
| Butyl stearate | 2 parts |
| Stearic acid | 1 part |
| Methyl ethyl ketone | 50 parts | followed by stirring and mixing for further 20 minutes, and the mixture was filtered through a filter having an average pore diameter of 1 µm, thereby a nonmagnetic layer coating solution was obtained.

A radiation-curable resin (dimethyloltricyclodecane diacrylate) (30 mass %) was dissolved in a methyl ethyl ketone solution, and the solution was coated on an aramid support having a thickness of 4 µm (pinholes having a diameter of 30 µm or more were present on the surface of the support $10^{-3}$ in number/m²) in a dry coating thickness of 0.1 µm by a coil bar and then dried. The film surface was irradiated with electron beam at accelerating voltage of 175 kV, beam current of 5 mA so that absorbed dose became 5 Mrad.

Subsequently, the above-obtained nonmagnetic layer coating solution was coated in a dry thickness of 2 µm on the subbing layer, and the magnetic layer coating solution was simultaneously multilayer-coated in a dry thickness of 0.1 µm on the nonmagnetic layer using a reverse roll. While the magnetic coating solution was still wet, the support coated with the magnetic coating solution was subjected to magnetic field orientation with a Co magnet of 500 mT and a solenoid magnet of 400 mT, then to calendering treatment (velocity: 100 m/min, linear pressure: 300 kg/cm (294 kN/cm), temperature: 90° C.) by the combination of metal roll—metal roll—metal roll—metal roll—metal roll—metal roll—metal roll, and slit to a width of 12.6 mm.

Example 2

A sample was prepared in the same manner as in Example 1 except for changing the thickness of the subbing layer to 0.05 µm.

Comparative Example 1

A sample was prepared in the same manner as in Example 1 except for using conventional alpha-$Fe_2O_3$ (average acicular ratio: 7.0, average long axis length: 0.14 µm, $S_{BET}$: 60 m²/g, surface treatment with $Al_2O_3$ and $SiO_2$, pH: 6.5 to 8.0) in place of the raft-like nonmagnetic powder used in the nonmagnetic layer in Example 1.

Comparative Example 2

A sample was prepared in the same manner as in Example 1 except for using resin RV240 not a radiation-curable resin (polyester copolymer, Vylon (trade name) manufactured by Toyobo Co., Ltd.) in place of the radiation-curable resin used in the subbing layer in Example 1.

Comparative Example 3

A sample was prepared in the same manner as in Example 1 except for changing the thickness of the subbing layer to 0.5 µm.

Each of the above-obtained samples was evaluated as follows.

Measuring Method:

(1) Minute Protrusions (PN)

The numbers of minute protrusions to the height of 20 nm in 10 µm square (100 µm²) were measured every 5 nm by using Nanoscope III [AFM (interatomic force microscope)] (a product of Digital Instruments Co.) and an SiN probe of a quadrangular pyramid having an arris angle of 70°, and the number of protrusions of the height of from 10 to 20 nm was obtained.

(2) Electromagnetic Characteristics

Error Number:

Each magnetic recording tape in the Examples and Comparative Examples was loaded in the following magnetic recording and reproducing system, and the number of errors at reproduction was measured on the following condition.

Servo-control was performed at 21° C. 50% RH, and one track (width: 20 µm) was reproduced with a tape of 90 m length. An output down of 35% or more and signals missing in length of 4 bit or more were taken as an error, and the generated numbers of errors were measured.

Magnetic Recording and Reproducing System (1) Thin Film Magnetic Head a. Recording Head Structure: An inductive head holding a two-turn thin film coil with a Co-based amorphous magnetic thin film yoke.

Track width: 24 µm, gap length: 1.4 µm b. Reproducing Head

Structure: A double shielded type shunt bias MR (magneto resistance) head. MR element: Fe/Ni (Permalloy) alloy thin film Track width: 10 µm, shield space: 1.4 µm (2) Assembly of Magnetic Recording and Reproducing System The recording and reproducing heads were loaded in F613A drive (3480 type 1/2 inch cartridge recording and reproducing apparatus of a magnetic recording tape) (manufactured by Fujitsu Limited), and magnetic recording and reproducing system of a tape speed of 10 inch/sec was manufactured.

S/N Ratio

Evaluation was performed by loading each tape in the above magnetic recording and reproducing system. Recording was performed by recording wavelength of 0.5 µm and S/N ratio was measured with the above recording and reproducing heads.

TABLE 1

| Example No. | Thickness of Subbing Layer (μm) | Subbing Layer | Nonmagnetic Powder in Nonmagnetic Layer | PN of Magnetic Layer (number/μm$^2$) | Error Number (number) | S/N Ratio (dB) |
|---|---|---|---|---|---|---|
| Example 1 | 0.1 | Radiation-curable resin | Raft-like nonmagnetic powder | 100 | 30 | +3 |
| Example 2 | 0.05 | Radiation-curable resin | Raft-like nonmagnetic powder | 150 | 50 | +2 |
| Comparative Example 1 | 0.1 | Radiation-curable resin | Conventional nonmagnetic powder | 1,200 | 200 | −2 |
| Comparative Example 2 | 0.05 | RV240 | Raft-like nonmagnetic powder | 2,000 | 700 | −3 |
| Comparative Example 3 | 0.5 | Radiation-curable resin | Raft-like nonmagnetic powder | 70 | 300 | −2.5 |

From the results shown in the above table, it is seen that the samples in Examples are low in error number and also S/N ratio is high as compared with those in Comparative Examples.

Since conventionally used nonmagnetic powder are used in the nonmagnetic layer in Comparative Example 1, lots of protrusions are present on the magnetic layer surface and errors are frequent. Further, the surface is coarse, so that S/N ratio is low.

Since conventionally used subbing agent is used in Comparative Example 2, the base cannot be smoothed, so that lots of protrusions are present on the magnetic layer surface even when raft-like nonmagnetic powder is used.

Since the thickness of the subbing layer in Comparative Example 3 is as thick as 0.5 μm, the pinholes of the support can be shielded and the protrusions on the magnetic layer surface are decreased. However, head touch is not uniform and S/N ratio is low, since the total tape thickness is thick.

The present invention can provide a magnetic recording medium having the effects shown below by providing a cured film formed of a radiation-curable resin having a thickness of from 0.05 to 0.1 μm on a support, a nonmagnetic layer containing raft-like nonmagnetic powder and a magnetic layer on the cured film in this order.

(1) A magnetic recording medium having high capacity whose total tape thickness is reduced can be provided.

(2) Electromagnetic characteristics are improved by smoothing the magnetic film surface.

(3) It is possible to use a support of inferior quality on which pinholes or the like are present.

This application is based on Japanese Patent application JP 2002-083291, filed Mar. 25, 2002, the entire content of which is hereby incorporated by reference, the same as if set forth at length.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising:
a support;
a subbing layer comprising a radiation-curable resin;
a nonmagnetic layer comprising a nonmagnetic powder and a binder; and
at least one magnetic layer comprising a ferromagnetic powder and a binder, in this order,
wherein the subbing layer has a thickness of from 0.05 to 1.0 μm, and the nonmagnetic powder has an average acicular ratio of 8 or more and has a form of a raft.

2. The magnetic recording medium according to claim 1, wherein the radiation-curable resin has an alicyclic structure and has two or more radiation-curable functional groups in one molecule, and the subbing layer is a layer cured by irradiation with radiation.

3. The magnetic recording medium according to claim 1, wherein from 5 to 1,000 protrusions having a height of from 10 to 20 nm measured by an interatomic force microscope (AFM) are present per 100 μm$^2$ at a surface of the magnetic layer.

4. The magnetic recording medium according to claim 1, wherein the radiation-curable resin has a molecular weight of from 200 to 1,000.

5. The magnetic recording medium according to claim 1, wherein the radiation-curable resin has a viscosity of from 5 to 200 mPa·s at 25° C.

6. The magnetic recording medium according to claim 1, wherein the radiation-curable resin comprises acrylic esters, acrylamides, methacrylic esters, methacrylic acid amides, allyl compounds, vinyl ethers, or vinyl esters.

7. The magnetic recording medium according to claim 1, wherein the radiation-curable resin comprises acrylic esters or methacrylic esters.

8. The magnetic recording medium according to claim 1, wherein the nonmagnetic powder has a pH value of from 6 to 9.

9. The magnetic recording medium according to claim 1, wherein the nonmagnetic powder has a specific surface area of from 80 to 120 m$^2$/g.

10. The magnetic recording medium according to claim 1, wherein the nonmagnetic powder has a surface covered with $Al_2O_3$, $SiO_2$, $TiO_2$, $ZrO_2$, $SnO_2$, $Sb_2O_3$ or ZnO.

11. The magnetic recording medium according to claim 1, wherein the nonmagnetic powder has a surface covered with $Al_2O_3$, $SiO_2$, $TiO_2$ and $ZrO_2$.

12. The magnetic recording medium according to claim 1, wherein the nonmagnetic powder has an average acicular ratio of 8 or more and has a form of a raft such that its ends in a longitudinal direction are branched.

* * * * *